US012671621B2

(12) United States Patent
Suehr et al.

(10) Patent No.: US 12,671,621 B2
(45) Date of Patent: *Jun. 30, 2026

(54) SYSTEM, METHOD, AND COMPUTER PROGRAM PRODUCT FOR DETECTING AN ANOMALY IN NETWORK ACTIVITY

(71) Applicant: CYBXSECURITY LLC, McKeesport, PA (US)

(72) Inventors: Tyler Suehr, Greensburg, PA (US); Mycal Pedder, Manor, PA (US); Thomas Pedder, Jeannette, PA (US)

(73) Assignee: CYBXSECURITY LLC, McKeesport, PA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/438,810

(22) Filed: Feb. 12, 2024

(65) Prior Publication Data

US 2024/0187301 A1     Jun. 6, 2024

Related U.S. Application Data

(63) Continuation of application No. 17/852,422, filed on Jun. 29, 2022, now Pat. No. 11,902,084.

(51) Int. Cl.
| | |
|---|---|
| *H04L 41/0631* | (2022.01) |
| *H04L 41/02* | (2022.01) |
| *H04L 41/0604* | (2022.01) |
| *H04L 41/0654* | (2022.01) |
| *H04L 61/4511* | (2022.01) |

(52) U.S. Cl.
CPC ........ *H04L 41/0631* (2013.01); *H04L 41/024* (2013.01); *H04L 41/0627* (2013.01); *H04L 41/0654* (2013.01); *H04L 61/4511* (2022.05)

(58) Field of Classification Search
CPC ............ H04L 41/0631; H04L 61/4511; H04L 41/024; H04L 41/0627; H04L 41/0654
See application file for complete search history.

(56) References Cited

U.S. PATENT DOCUMENTS

| | | | | |
|---|---|---|---|---|
| 10,437,897 | B2 * | 10/2019 | Carroll ................ | G06F 16/9535 |
| 10,560,423 | B1 * | 2/2020 | Rodriguez ............. | H04L 67/02 |
| 11,075,857 | B2 * | 7/2021 | Mestery ................. | H04L 49/70 |
| 11,477,161 | B1 * | 10/2022 | Mishra ................ | H04L 61/4511 |
| 11,552,925 | B1 * | 1/2023 | Craciun ............. | H04L 63/0428 |
| 11,902,084 | B2 * | 2/2024 | Suehr .................... | H04L 41/024 |

(Continued)

*Primary Examiner* — Abdelbasst Talioua
(74) *Attorney, Agent, or Firm* — The Webb Law Firm

(57) ABSTRACT

Provided are systems for detecting an anomaly in network activity using Domain Name System (DNS) query data that include a processor to receive data associated with a plurality of DNS queries from a plurality of data sources, parse the data associated with the plurality of DNS queries to provide DNS query data and network domain data, route the DNS query data to a first queue using a queries exchange, route the network domain data to a second queue using a domains exchange, poll the first queue and the second queue with a microservice application to receive the DNS query data and the network domain data with the microservice application for processing, and detect a characteristic of the one or more DNS queries of the plurality of DNS queries based on the DNS query data and the network domain data. Methods and computer program products are also disclosed.

17 Claims, 11 Drawing Sheets

(56)                  References Cited

U.S. PATENT DOCUMENTS

| | | | | |
|---|---|---|---|---|
| 2015/0295882 A1* | 10/2015 | Kaliski, Jr. | ......... | H04L 61/4511 |
| | | | | 709/217 |
| 2016/0205106 A1* | 7/2016 | Yacoub | .............. | H04W 12/041 |
| | | | | 726/28 |
| 2018/0006912 A1* | 1/2018 | Sokolik | ................... | G06F 16/22 |
| 2018/0351976 A1* | 12/2018 | Shitrit-Efergan | ... | H04L 63/1425 |
| 2020/0106791 A1* | 4/2020 | Bagnall | .............. | H04L 61/4511 |
| 2021/0400061 A1* | 12/2021 | Antoniewicz | ....... | H04L 61/4511 |
| 2022/0174031 A1* | 6/2022 | Davis | ................... | H04L 63/101 |
| 2022/0210170 A1 | 6/2022 | DiPinto et al. | | |
| 2023/0319093 A1* | 10/2023 | Kaimal | .............. | H04L 61/4511 |
| | | | | 726/22 |

* cited by examiner

200

202

300

400

401
Receive data associated with DNS queries

Figure 4B:
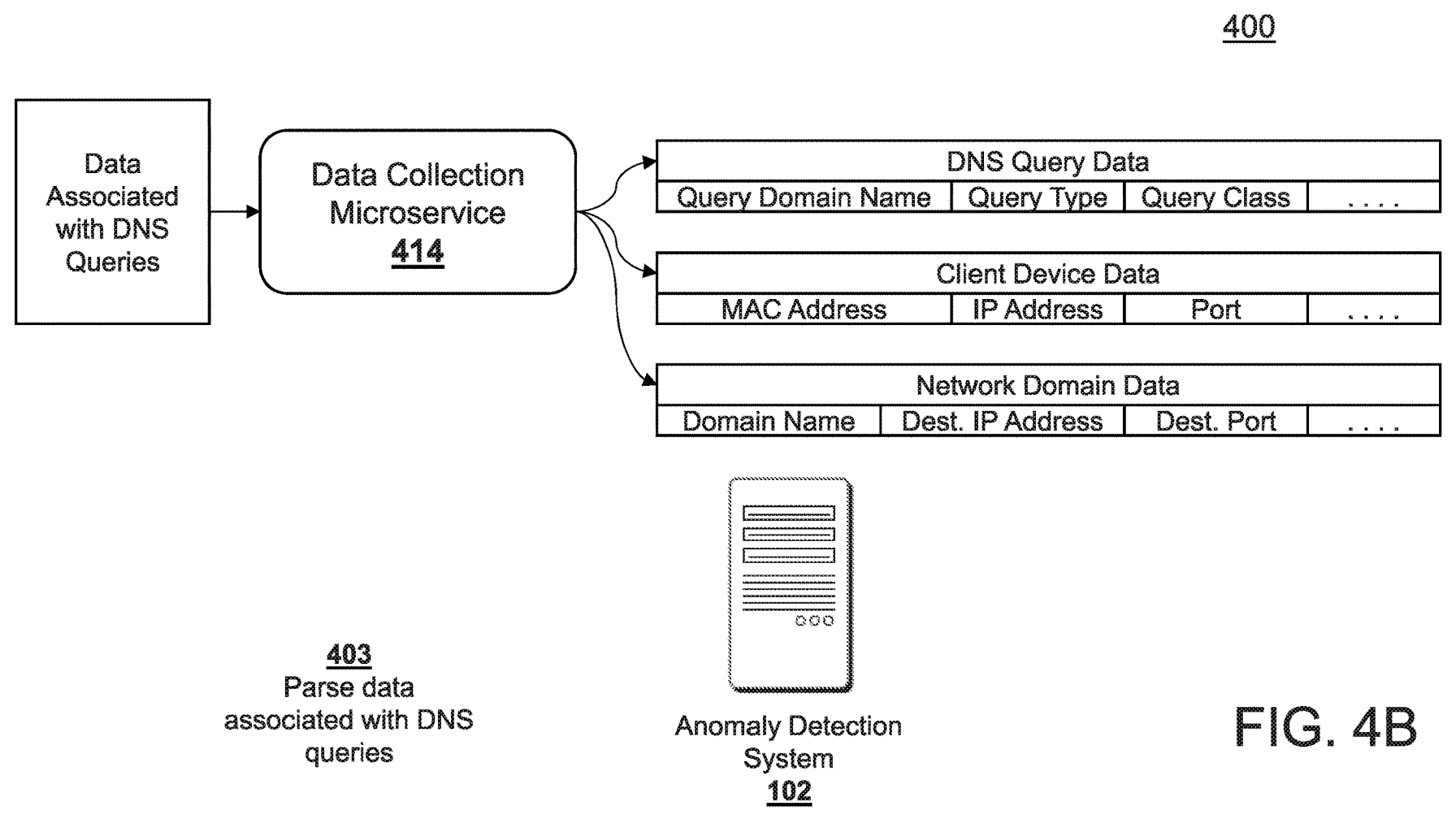

400

| DNS Query Data | | | |
|---|---|---|---|
| Query Domain Name | Query Type | Query Class | . . . |

| Client Device Data | | | |
|---|---|---|---|
| MAC Address | IP Address | Port | . . . |

| Network Domain Data | | | |
|---|---|---|---|
| Domain Name | Dest. IP Address | Dest. Port | . . . |

Data Collection Microservice 414

Data Associated with DNS Queries

Anomaly Detection System 102

403
Parse data associated with DNS queries

409
Poll queue with a
research microservice

SYSTEM, METHOD, AND COMPUTER PROGRAM PRODUCT FOR DETECTING AN ANOMALY IN NETWORK ACTIVITY

CROSS-REFERENCE TO RELATED APPLICATIONS

This application is a continuation of U.S. patent application Ser. No. 17/852,422 filed Jun. 29, 2022, the disclosure of which is hereby incorporated by reference in its entirety.

BACKGROUND

1. Field

This disclosure relates generally to network data collection and analysis and, in some non-limiting embodiments, to systems, methods, and computer program products for detecting an anomaly in network activity.

2. Technical Considerations

The Domain Name System (DNS) is a hierarchical and decentralized naming system used to identify computers (e.g., servers) accessible through the Internet or other Internet Protocol (IP) networks. The DNS may contain resource records which associate (e.g., map) domain names with other forms of information. The resource records contained in the DNS may be used to map human-friendly domain names (e.g., google.com) to a numerical IP address computers need to locate services and devices (e.g., network resources) associated with the domain name using the underlying network protocols.

In some instances, a client device may attempt to access a network resource using a Uniform Resource Locator (URL) containing a domain name (e.g., the URL is www-.google.com, the domain name is google.com). In order to access the network resource, the client device may construct a DNS query including the domain name of the network resource. The client device may transmit the DNS query to a DNS server so that the domain name may be translated into an IP address. The domain name is translated to an IP address based on the map of human-friendly domain names to numerical IP addresses contained in the DNS. The map of human-friendly domain names to numerical IP addresses (e.g., information associated with the DNS) may be stored on the DNS server. The client device may receive a response (e.g., a message) from the DNS server including the IP address of a server (e.g., a host server address) hosting the network resource that the client device attempted to access. A web browser executing on the client device may access the network resource by communicating with the server hosting the network resource via the IP address.

In some instances, a DNS query may refer to a request (e.g., a message) transmitted from a client device (e.g., the web browser of a client device) to a DNS server requesting an IP address associated with a domain name of a network resource. DNS queries may be transmitted from a client device to a DNS server when the client device attempts to access a network resource using the domain name (e.g., accessing google.com using a web browser on the client device).

The DNS server may use a blacklist and/or a whitelist to control access to network resources. A blacklist may refer to an access control mechanism that permits access to all elements (email addresses, users, passwords, URLs, IP addresses, domain names, file hashes, requests, etc.) except those elements explicitly mentioned in the blacklist. Those elements on the blacklist are denied access (e.g., to a system, network, server, network resource, etc.). A whitelist may refer to an access control mechanism in which only elements on the whitelist are permitted access beyond the gate (e.g., firewall, application gateway, and/or the like) being used. Blacklists and/or whitelists may be applied at various locations of access control in a security architecture for a network, such as at a host server, a web proxy, a DNS server, an email server, a firewall, directory servers, or application authentication gateways. The type of element blocked by a blacklist may be influenced by the location of access control. For example, DNS servers may be well-suited to block domain names and/or IP addresses, but not URLs.

Computer networks, particularly networks connecting Internet of Things (IoT) devices, may be vulnerable to connections and attacks from malicious devices and/or websites. Unknown devices with IP addresses foreign to the network may attempt to connect to the network to access an IoT device connected to the network. The unknown devices may successfully connect to the network with the IoT devices making the IoT devices vulnerable to attacks. Some of the technical security concerns of IoT devices are similar to those of servers, workstations, and smartphones. The technical security concerns may include using weak authentication, forgetting to change default credentials, using unencrypted messages sent between devices, Structured Query Language (SQL) injections, man-in-the-middle attacks, and poor handling of security updates. However, some IoT devices may have severe operational limitations on the computational power available to them. The operational limitations on computation power often cause IoT devices to be unable to use basic security measures, such as implementing firewalls or using strong cryptosystems to encrypt their communications with other devices. Additionally, the low price and consumer focus of many IoT devices may make a robust security patching system uncommon or unfeasible for such IoT devices. Even where a network has a blacklist or whitelist enabled at a DNS server, security vulnerabilities may exist as new unknown devices and IP addresses emerge or as existing IP addresses become associated with malicious devices and/or websites.

However, some systems used to analyze DNS query data may use schemes that are not fully secure. For example, some systems may rely on schemes that cannot verify the authenticity of DNS query data and are susceptible to forged data and/or susceptible to receiving data from rogue data sources. Additionally, systems may not be capable of handling the amount of data that may be produced when collecting DNS query data over time. For example, systems may not be capable of analyzing an entire set of DNS query data over time to detect security vulnerabilities. Such large sets of DNS query data may cause some systems to crash or may cause systems to sacrifice incoming data (e.g., delete incoming data, fail to collect incoming data) in order to keep the system running.

SUMMARY

Accordingly, disclosed are systems, methods, and computer program products for detecting an anomaly in network activity using DNS query data. Embodiments of the present application provide a secure and efficient way of collecting and analyzing DNS query data from various data sources and/or devices designed to gather DNS query data within a network. The collection of DNS query data ensures that the data sources and/or devices designed to gather DNS query data can continue to operate without failure so that no DNS query data is missed while the analysis of DNS query data ensures that malicious activity can be detected and remedial actions can be taken within a network.

Further embodiments are set forth in the following numbered clauses:

Clause 1: A method for detecting anomalies in network data, comprising: receiving, with at least one processor, data associated with a plurality of Domain Name System (DNS) queries from a plurality of data sources; parsing, with the at least one processor, the data associated with the plurality of DNS queries to provide DNS query data and network domain data; routing, with the at least one processor, the DNS query data to a first queue using a queries exchange; routing, with the at least one processor, the network domain data to a second queue using a domains exchange; polling, with the at least one processor, the first queue and the second queue with a microservice application to receive the DNS query data and the network domain data with the microservice application for processing; and detecting, with the at least one processor, a characteristic of one or more DNS queries of the plurality of DNS queries based on the DNS query data and the network domain data.

Clause 2: The method of clause 1, further comprising: parsing, with the at least one processor, the data associated with the plurality of DNS queries to provide client device data; and routing, with the at least one processor, the client device data to a third queue using a client exchange.

Clause 3: The method of clause 1 or 2, further comprising: determining whether each data source of the plurality of data sources is authorized for transmitting the data associated with the plurality of DNS queries, wherein determining whether each data source is authorized for transmitting the data associated with the plurality of DNS queries comprises: checking network permissions of the data source based on an authorization token included in the data associated with the plurality of DNS queries corresponding to a token stored in a token management system.

Clause 4: The method of any of clauses 1-3, wherein detecting a characteristic of one or more DNS queries of the plurality of DNS queries comprises: storing the DNS query data and the network domain data in a time-series database; determining a geolocation of a server associated with a domain and a category of the domain based on the DNS query data and the network domain data; storing the DNS query data, the network domain data, the geolocation of the server, and the category of the domain in a database; and determining the characteristic of one or more DNS queries of the plurality of DNS queries based on the DNS query data, the network domain data, the geolocation of the server, and the category of the domain.

Clause 5: The method of any of clauses 1-4, wherein parsing the DNS queries comprises: decoding the data associated with the plurality of DNS queries to provide decoded data associated with the plurality of DNS queries; parsing the decoded data associated with the plurality of DNS queries into the DNS query data and the network domain data; and publishing the DNS query data to the queries exchange and the network domain data to the domains exchange.

Clause 6: The method of any of clauses 1-5, further comprising transmitting a confirmation message to at least one data source of the plurality of data sources based on routing the DNS query data and the network domain data, wherein the confirmation message comprises a message indicating success or a message indicating failure, wherein the message indicating success causes the at least one data source of the plurality of data sources to delete the data associated with the plurality of DNS queries from memory of the at least one data source and the message indicating failure causes the at least one data source of the plurality of data sources to retain the data associated with the plurality of DNS queries in the memory of the at least one data source to be received at a next recurring period.

Clause 7: The method of any of clauses 1-6, wherein polling the first queue and the second queue comprises: subscribing, with the microservice application, to the first queue and the second queue by transmitting a subscription message from the microservice application to the queries exchange and the domains exchange; and repeatedly transmitting a poll message to the first queue and the second queue, wherein the poll message checks for new data associated with the plurality of DNS queries available in the first queue and the second queue.

Clause 8: A system for detecting anomalies in network data, comprising at least one processor programmed or configured to: receive data associated with a plurality of Domain Name System (DNS) queries from a plurality of data sources; parse the data associated with the plurality of DNS queries to provide DNS query data and network domain data; route the DNS query data to a first queue using a queries exchange; route the network domain data to a second queue using a domains exchange; poll the first queue and the second queue with a microservice application to receive the DNS query data and the network domain data with the microservice application for processing; and detect a characteristic of one or more DNS queries of the plurality of DNS queries based on the DNS query data and the network domain data.

Clause 9: The system of clause 8, wherein the at least one processor is further programmed or configured to: parse the data associated with the plurality of DNS queries to provide client device data; and route the client device data to a third queue using a client exchange.

Clause 10: The system of clause 8 or 9, wherein the at least one processor is further programmed or configured to: determine whether each data source of the plurality of data sources is authorized for transmitting the data associated with the plurality of DNS queries, wherein when determining whether each data source is authorized for transmitting the data associated with the plurality of DNS queries, the at least one processor is programmed or configured to: check network permissions of the data source based on an authorization token included in the data associated with the plurality of DNS queries corresponding to a token stored in a token management system.

Clause 11: The system of any of clauses 8-10, wherein when detecting a characteristic of one or more DNS queries of the plurality of DNS queries, the at least one processor is programmed or configured to: store the DNS query data and the network domain data in a time-series database; determine a geolocation of a server associated with a domain and a category of the domain based on the DNS query data and the network domain data; store the DNS query data, the network domain data, the geolocation of the server, and the category of the domain in a database; and determine the characteristic of one or more DNS queries of the plurality of DNS queries based on the DNS query data, the network domain data, the geolocation of the server, and the category of the domain.

Clause 12: The system of any of clauses 8-11, wherein when parsing the DNS queries, the at least one processor is programmed or configured to: decode the data associated with the plurality of DNS queries to provide decoded data associated with the plurality of DNS queries; parse the decoded data associated with the plurality of DNS queries into the DNS query data and the network domain data; and publish the DNS query data to the queries exchange and the network domain data to the domains exchange.

Clause 13: The system of any of clauses 8-12, wherein the at least one processor is further programmed or configured to transmit a confirmation message to at least one data source of the plurality of data sources based on routing the DNS query data and the network domain data, wherein the confirmation message comprises a message indicating success or a message indicating failure, wherein the message indicating success causes the at least one data source of the plurality of data sources to delete the data associated with the plurality of DNS queries from memory of the at least one data source and the message indicating failure causes the at least one data source of the plurality of data sources to retain the data associated with the plurality of DNS queries in the memory of the at least one data source to be received at a next recurring period.

Clause 14: The system of any of clauses 8-13, wherein when polling the first queue and the second queue, the at least one processor is programmed or configured to: subscribe, with the microservice application, to the first queue and the second queue by transmitting a subscription message from the microservice application to the queries exchange and the domains exchange; and repeatedly transmit a poll message to the first queue and the second queue, wherein the poll message checks for new data associated with the plurality of DNS queries available in the first queue and the second queue.

Clause 15: A computer program product for detecting anomalies in network data, the computer program product comprising at least one non-transitory computer-readable medium including one or more instructions that, when executed by at least one processor, cause the at least one processor to: receive data associated with a plurality of Domain Name System (DNS) queries from a plurality of data sources; parse the data associated with the plurality of DNS queries to provide DNS query data and network domain data; route the DNS query data to a first queue using a queries exchange; route the network domain data to a second queue using a domains exchange; poll the first queue and the second queue with a microservice application to receive the DNS query data and the network domain data with the microservice application for processing; and detect a characteristic of one or more DNS queries of the plurality of DNS queries based on the DNS query data and the network domain data.

Clause 16: The computer program product of clause 15, wherein the one or more instructions further cause the at least one processor to: parse the data associated with the plurality of DNS queries to provide client device data; and route the client device data to a third queue using a client exchange.

Clause 17: The computer program product of clause 15 or 16, wherein the one or more instructions further cause the at least one processor to: determine whether each data source of the plurality of data sources is authorized for transmitting the data associated with the plurality of DNS queries, wherein the one or more instructions that cause the at least one processor to determine whether each data source is authorized for transmitting the data associated with the plurality of DNS queries, cause the at least one processor to: check network permissions of the data source based on an authorization token included in the data associated with the plurality of DNS queries corresponding to a token stored in a token management system.

Clause 18: The computer program product of any of clauses 15-17, wherein the one or more instructions that cause the at least one processor to detect a characteristic of one or more DNS queries of the plurality of DNS queries, cause the at least one processor to: store the DNS query data and the network domain data in a time-series database; determine a geolocation of a server associated with a domain and a category of the domain based on the DNS query data and the network domain data; store the DNS query data, the network domain data, the geolocation of the server, and the category of the domain in a database; and determine the characteristic of one or more DNS queries of the plurality of DNS queries based on the DNS query data, the network domain data, the geolocation of the server, and the category of the domain.

Clause 19: The computer program product of any of clauses 15-18, wherein the one or more instructions that cause the at least one processor to parse the DNS queries, cause the at least one processor to: decode the data associated with the plurality of DNS queries to provide decoded data associated with the plurality of DNS queries; parse the decoded data associated with the plurality of DNS queries into the DNS query data and the network domain data; and publish the DNS query data to the queries exchange and the network domain data to the domains exchange.

Clause 20: The computer program product of any of clauses 15-19, wherein the one or more instructions further cause the at least one processor to transmit a confirmation message to at least one data source of the plurality of data sources based on routing the DNS query data and the network domain data, wherein the confirmation message comprises a message indicating success or a message indicating failure, wherein the message indicating success causes the at least one data source of the plurality of data sources to delete the data associated with the plurality of DNS queries from memory of the at least one data source and the message indicating failure causes the at least one data source of the plurality of data sources to retain the data associated with the plurality of DNS queries in the memory of the at least one data source to be received at a next recurring period.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIGS. 4A-4H are diagrams of non-limiting embodiments of an implementation of a process for detecting an anomaly in network activity using DNS query data.

DESCRIPTION

Figure 1:
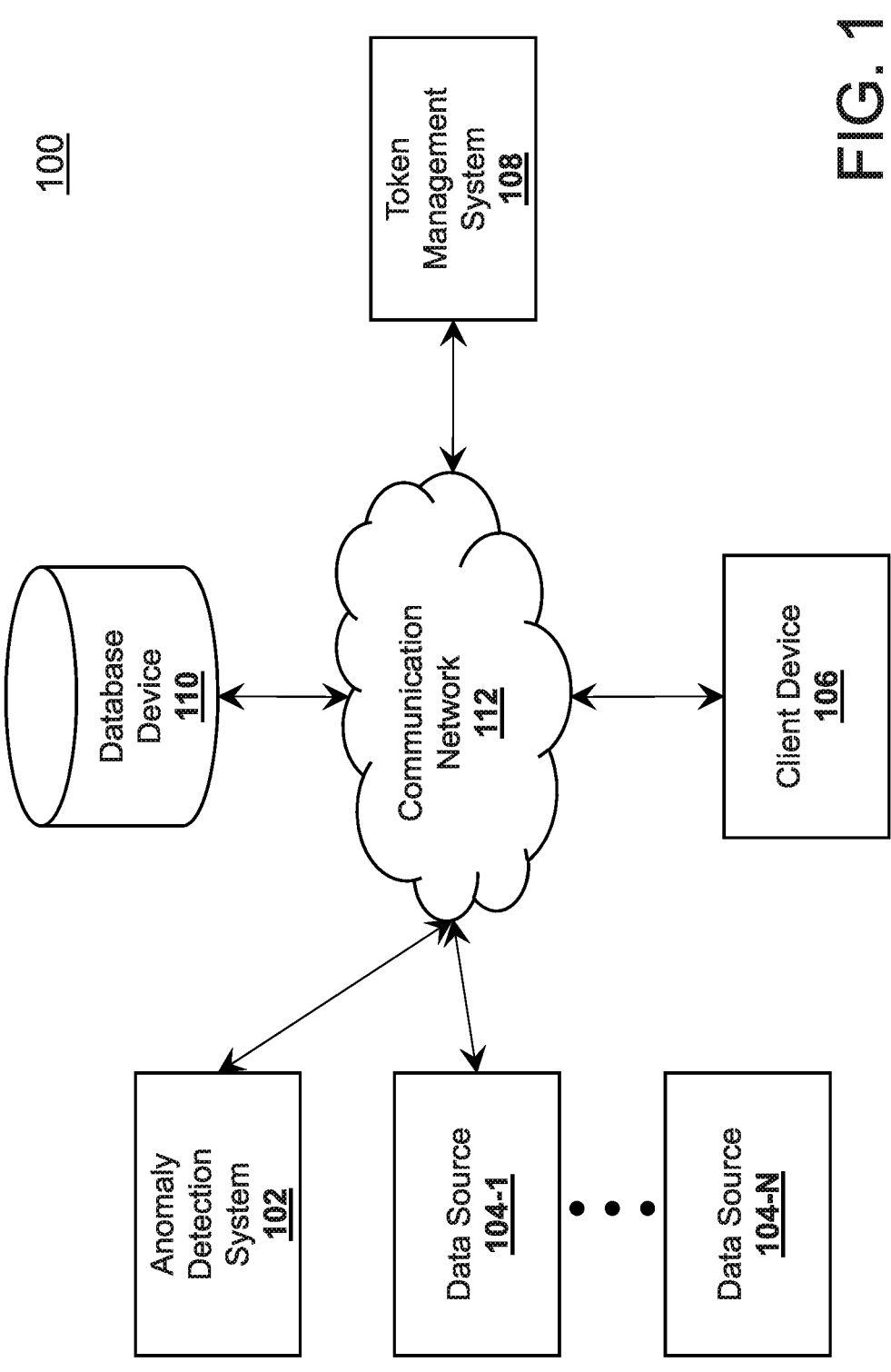
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phrase "based on" may also mean "in response to" where appropriate.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the terms "client" and "client device" may refer to one or more computing devices, such as processors, storage devices, and/or similar computer components, that access a service made available by a server. In some non-limiting embodiments, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are systems, methods, and computer program products for detecting an anomaly in network activity using DNS query data that are implemented in a computer network to analyze DNS traffic. Embodiments of the present disclosure may include an anomaly detection system that is programmed or configured to: receive data associated with a plurality of DNS queries from a plurality of data sources, parse the data associated with the plurality of DNS queries to provide DNS query data and network domain data, route the DNS query data to a first queue using a queries exchange, route the network domain data to a second queue using a domains exchange, poll the first queue and the second queue with a microservice application to receive the DNS query data and the network domain data with the microservice application for processing, and detect a characteristic of one or more DNS queries of the plurality of DNS queries based on the DNS query data and the network domain data.

In some non-limiting embodiments, the anomaly detection system is programmed or configured to: determine whether each data source of the plurality of data sources is authorized for transmitting the data associated with a plurality of DNS queries, wherein determining whether each data source is authorized for transmitting the data associated with a plurality of DNS queries may include checking network permissions of the data source based on a token included in the data associated with a plurality of DNS queries corresponding to an authorization token stored in a token management system.

In this way, the anomaly detection system may provide a secure way to collect and analyze DNS query data. For example, the anomaly detection system may verify the authenticity of incoming data associated with the plurality DNS queries by authorizing the data source that is supplying the data associated with the plurality DNS queries to the anomaly detection system. The source of the incoming data is known and authorized before the data associated with the plurality of DNS queries is permitted to propagate through the anomaly detection system (e.g., before the data associated with the DNS queries is forwarded to the exchanges by data collection microservice of anomaly detection system 102). Incoming data that is not authenticated (e.g., forged data) or incoming data from unauthorized data sources (e.g., rogue data sources, unknown data sources) are prevented from transmitting data to the anomaly detection system. Additionally, non-limiting embodiments of the present disclosure may be capable of handling large amounts of data that may be produced when collecting DNS query data over time. For example, the anomaly detection system may be capable of analyzing an entire set of DNS query data over time (e.g., all DNS query data produced by devices in a network the life of the network) to detect security vulnerabilities. Non-limiting embodiments of the present disclosure may process large sets of DNS query data without encountering system crashes or system downtime (e.g., time when the system is not operational, thereby resulting in lost data). Furthermore, non-limiting embodiments of the present disclosure may analyze historical data (e.g., data previously collected and stored in a storage component for future processing) associated with DNS queries in order to detect anomalies that occurred within a network previously and take action based on the anomalies that are detected.

Referring now to FIG. 1, FIG. 1 is a diagram of an example environment 100 in which devices, systems, methods, and/or products described herein may be implemented. As shown in FIG. 1, environment 100 includes anomaly detection system 102, data source 104-1 to data source 104-N (e.g., a plurality of data sources, referred to individually as data source 104 and collectively as data sources 104 where appropriate), client device 106, token management system (TMS) 108, database device 110, and communication network 112. Anomaly detection system 102, data sources 104, client device 106, TMS 108, and database device 110 may interconnect (e.g., establish a connection to communicate, and/or the like) via wired connections, wireless connections, or a combination of wired and wireless connections. Data source 104-1 through data source 104-N may be referred to collectively as data sources 104 and/or referred to individually as data source 104 as appropriate.

Communication between the components shown in FIG. 1 may include the use of protocols for specified purposes and may be based on (e.g., involve the use of) Transmission Control Protocol (TCP) and/or Hyper-Text Transfer Protocol (HTTP), an established token-based authorization protocol (e.g., JavaScript Object Notation (JSON) web token (JWT)). Additionally or alternatively, communication between the components shown in FIG. 1 may involve an application programming interface (API). In some non-limiting embodiments, the API may allow for direct communication with TMS 108.

Anomaly detection system 102 may include one or more computing devices configured to communicate with data sources 104, client device 106, TMS 108, and/or database device 110 via communication network 112. For example, anomaly detection system 102 may include a group of servers and/or other like devices. In some non-limiting embodiments, anomaly detection system 102 may be associated with (e.g., operated by) a client device, as described herein. Additionally or alternatively, anomaly detection system 102 may be a component of a client device. In some non-limiting embodiments, anomaly detection system 102 may include TMS 108. In some non-limiting embodiments, anomaly detection system 102 may transmit data and/or messages to database device 110. In some non-limiting embodiments, anomaly detection system 102 may include one or more microservice applications as a component of anomaly detection system 102 (e.g., a software component). For example, anomaly detection system 102 may include a data collection microservice, an aggregation microservice, a research microservice, a trend analysis microservice, and/or additional microservices. In some non-limiting embodiments, anomaly detection system 102 may include a message broker component (e.g., a software component). In some non-limiting embodiments, anomaly detection system 102 may include one or more message exchange components (e.g., message router) and/or one or more message queue components. In some non-limiting embodiments, one or more microservice applications, one or more message exchange components, and/or one or more queues may be components of a message broker component (e.g., a software component).

A microservice application may refer to a loosely-coupled software application and/or a loosely-coupled software service that follows a microservice architecture. In the microservice architecture, software services are fine-grained and the protocols are lightweight and may have interfaces which are treated as a public API. The microservice application may exist and may be reusable (e.g., portable to other software applications and/or systems without requiring changes to the microservice application) independent of other microservice applications. Loose coupling may refer to the practice of developing and/or designing software services, such that some dependencies are reduced and the complexities around dependencies of the software service are minimized. Communication requirements for the microservice application may also be reduced based on the microservice architecture. The microservice application may have a single responsibility or may offer a single service to the applications and/or systems the microservice application executes with. One or more microservice applications may be used in a single application and/or system (e.g., anomaly detection system 102) to provide desired functionality of that application and/or system.

Data sources 104 may include one or more computing devices configured to communicate with anomaly detection system 102, client device 106, TMS 108, and/or database device 110 via communication network 112. For example, data sources 104 may include a server, a desktop computer (e.g., a client device that communicates with a server), a mobile device, an IoT device, and/or the like. In some non-limiting embodiments, data sources 104 may be associated with a network (e.g., a network of computing devices, such as servers, desktop computers, mobile devices, IoT devices, and/or the like). Data sources 104 may include a network monitoring application executing on data sources 104 and/or a DNS server configured to execute on data sources 104 within a network (e.g., Pi-Hole®) that is associated with anomaly detection system 102.

Client device 106 may include one or more computing devices configured to communicate with anomaly detection system 102, data sources 104, TMS 108, and/or database device 110 via communication network 112. For example, client device 106 may include a desktop computer (e.g., a client device that communicates with a server), a mobile device, an IoT device, and/or the like. In some non-limiting embodiments, client device 106 may be associated with a user (e.g., an individual operating a device) and/or a network.

TMS 108 may include a secure vault component (e.g., a secure server). In some non-limiting embodiments, TMS 108 may generate tokens (e.g., tokens for authorization of devices, such as data sources 104 and/or client device 106) which are stored exclusively on TMS 108 and are not exported to other devices and/or applications. TMS 108 may be secured by a secure cryptography mechanism (e.g., Shamir's Secret Sharing (SSS)).

Database device 110 may include one or more databases used for storing data and/or messages. Database device 110 may be updated with new data via communication network 112. Database device 110 may be configured to communicate with anomaly detection system 102 and/or data sources 104 via communication network 112. In some non-limiting embodiments, database device 110 may communicate with anomaly detection system 102 regardless of the type of database structure included in database device 110 (e.g., relational databases, NoSQL databases, time-series databases, document databases, and/or the like).

Communication network 112 may include one or more wired and/or wireless networks. For example, communication network 112 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 is provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
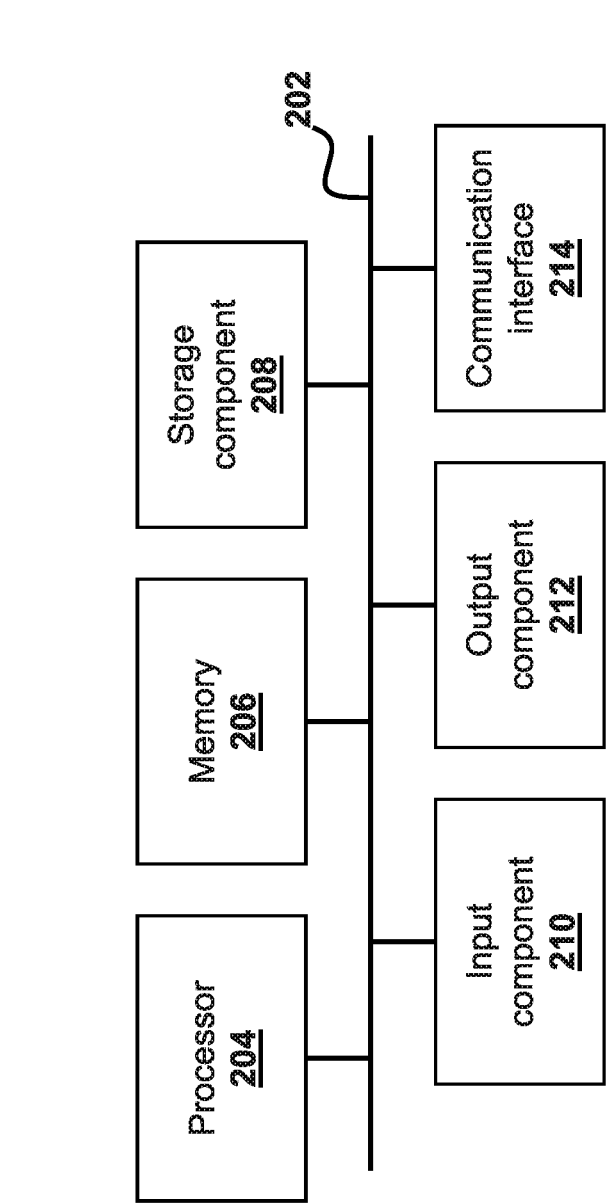
FIG. 2 is a diagram of a non-limiting embodiment of components of one or more devices and/or one or more systems of FIG. 1.

Referring now to FIG. 2, FIG. 2 is a diagram of example components of device 200. Device 200 may correspond to anomaly detection system 102 (e.g., one or more devices of anomaly detection system 102), data sources 104, client device 106, TMS 108, and/or database device 110. In some non-limiting embodiments, anomaly detection system 102, data sources 104, client device 106, TMS 108, and/or database device 110 may include at least one device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some non-limiting embodiments, storage component 208 may be the same as or similar to database device 110.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

Memory 206 and/or storage component 208 may include data storage or one or more data structures (e.g., a database and/or the like). Device 200 may be capable of receiving information from, storing information in, communicating information to, or searching information stored in the data storage or one or more data structures in memory 206 and/or storage component 208. For example, the information may include input data, output data, network data, device data, or any combination thereof.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
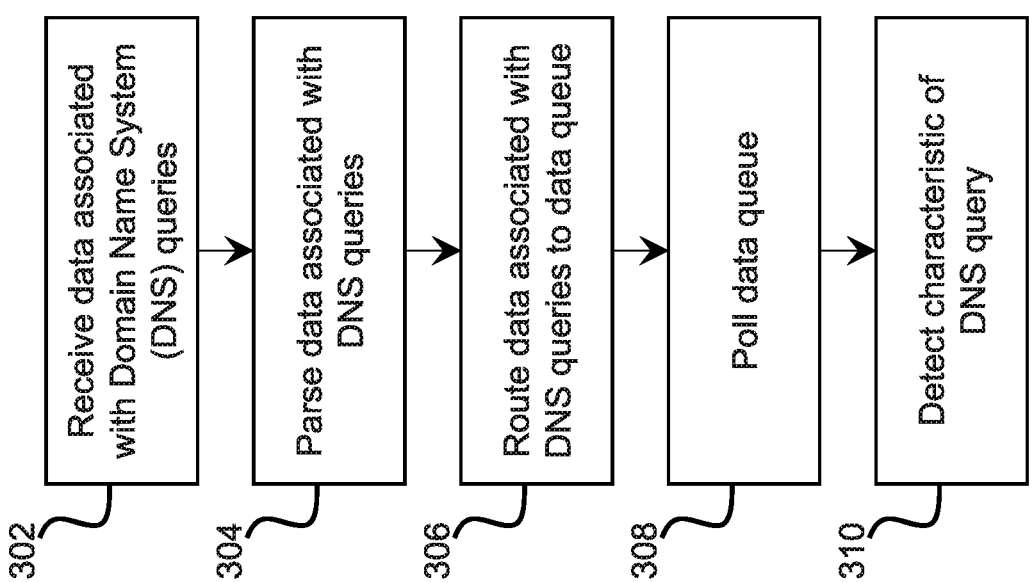
FIG. 3 is a flowchart of a non-limiting embodiment of a process for detecting an anomaly in network activity using DNS query data.

Referring now to FIG. 3, FIG. 3 is a flowchart of a non-limiting embodiment of a process 300 for detecting an anomaly in network activity using DNS query data. In some non-limiting embodiments, one or more of the functions described with respect to process 300 may be performed (e.g., completely, partially, etc.) by anomaly detection system 102. In some non-limiting embodiments, one or more of the steps of process 300 may be performed (e.g., completely, partially, and/or the like) by another device or a group of devices separate from or including anomaly detection system 102, such as client device 106.

As shown in FIG. 3, at step 302, process 300 may include receiving data associated with DNS queries. For example, anomaly detection system 102 may receive data associated with a plurality of DNS queries from a plurality of data sources 104. In some non-limiting embodiments, anomaly detection system 102 may determine whether each data source 104 of the plurality of data sources 104 is authorized for transmitting the data associated with a plurality of DNS queries. In some non-limiting embodiments, anomaly detection system 102 may determine whether each data source 104 is authorized for transmitting the data associated with a plurality of DNS queries by checking network permissions of data source 104 based on a token included in the data associated with a plurality of DNS queries corresponding to an authorization token stored in a token management system.

As shown in FIG. 3, at step 304, process 300 may include parsing data associated with DNS queries. For example, anomaly detection system 102 may parse the data associated with the plurality of DNS queries to provide DNS query data and network domain data. In some non-limiting embodiments, anomaly detection system 102 may parse the data associated with the plurality of DNS queries to provide client device data. In some non-limiting embodiments, anomaly detection system 102 may decode the data associated with the plurality of DNS queries to provide decoded data associated with the plurality of DNS queries. In some non-limiting embodiments, anomaly detection system 102 may parse the decoded data into the DNS query data and the network domain data. In some non-limiting embodiments, anomaly detection system 102 may publish the DNS query data (e.g., with data collection microservice 414) to the queries exchange (e.g., queries exchange 420) and the network domain data to the domains exchange (e.g., domains exchange 416). In some non-limiting embodiments, anomaly detection system 102 may include data collection microservice 414 (e.g., a software component) to decode the data associated with the plurality of DNS queries, parse the decoded data to provide parsed data, and publish the parsed data to the one or more exchanges.

As shown in FIG. 3, at step 306, process 300 may include routing data associated with DNS queries to a data queue. For example, anomaly detection system 102 may route the DNS query data to a first queue using a queries exchange. In some non-limiting embodiments, anomaly detection system 102 may route the network domain data to a second queue using a domains exchange. In some non-limiting embodiments, anomaly detection system 102 may route the client device data to a third queue using a clients exchange.

In some non-limiting embodiments, anomaly detection system 102 may transmit a confirmation message to data source 104 based on routing the DNS query data, the network domain data, and/or the client device data. In some non-limiting embodiments, the confirmation message may include a message indicating success or a message indicating failure. In some non-limiting embodiments or aspects, success may refer to anomaly detection system 102 (e.g., data collection microservice 414 of anomaly detection system 102) and/or TMS 108 authorizing data source 104 and anomaly detection system 102 routing (e.g., forwarding, transmitting) the DNS query data to the queries exchange, routing the network domain data to the domains exchange, and/or routing the client device data to the clients exchange. In some non-limiting embodiments or aspects, anomaly detection system 102 (e.g., data collection microservice 414 of anomaly detection system 102) may route the DNS query data to the queries exchange, the network domain data to the domains exchange, and/or the client device data to the clients exchange in response to TMS 108 authorizing data source 104. In this way, once the data associated with the plurality of DNS queries is received from data source 104 and routed by anomaly detection system 102 to the domains exchange, the queries exchange, and/or the clients exchange, the data associated with the plurality of DNS queries can be said to be published (e.g., success, successfully published, successfully transmitted, etc.).

In some non-limiting embodiments, anomaly detection system 102 may cause data source 104 to delete the data associated with the plurality of DNS queries from memory (e.g., storage) of data source 104. In some non-limiting embodiments or aspects, anomaly detection system 102 may cause data source 104 to delete the data associated with the plurality of DNS queries from memory in response to transmitting the message indicating success. For example, anomaly detection system 102 may transmit a message (e.g., the message indicating success) to data source 104 including instructions (e.g., a signal) to delete the data associated with the plurality of DNS queries from memory. In this way, anomaly detection system 102 may continue to collect new data associated with a plurality of DNS queries from data source 104 without anomaly detection system 102 and/or data source 104 crashing or reaching a capacity of stored data. This may allow anomaly detection system 102 and/or data source 104 to continue operating, such that anomaly detection system 102 and/or data source 104 may continuously collect DNS query data without becoming unavailable (e.g., offline, failing to function).

In some non-limiting embodiments or aspects, failure may refer to anomaly detection system 102 (e.g., data collection microservice 414 of anomaly detection system 102) and/or TMS 108 failing to authorize data source 104 (e.g., TMS 108 determines data source 104 is unauthorized) and anomaly detection system 102 failing to route the DNS query data to the queries exchange, the network domain data to the domains exchange, and/or the client device data to the clients exchange. In some non-limiting embodiments or aspects, anomaly detection system 102 (e.g., data collection microservice 414 of anomaly detection system 102) may fail to route the DNS query data to the queries exchange, the network domain data to the domains exchange, and/or the client device data to the clients exchange in response to TMS 108 failing to authorize data source 104. In this way, once the data associated with the plurality of DNS queries is received from data source 104 and anomaly detection system 102 and/or TMS 108 determines data source 104 is unauthorized, anomaly detection system 102 may determine the data associated with the plurality of DNS queries cannot be published (e.g., failure, failed to publish, failure to transmit, etc.).

In some non-limiting embodiments, anomaly detection system 102 may cause data source 104 to retain the data associated with the plurality of DNS queries in the memory of data source 104 in response to transmitting the message indicating failure. In some non-limiting embodiments or aspects, anomaly detection system 102 may receive the data associated with the plurality of DNS queries that is retained in the memory of data source 104 at a next recurring period. For example, anomaly detection system 102 may fail to route the data associated with the plurality of DNS queries based on TMS 108 determining data source 104 is unauthorized. Anomaly detection system 102 may transmit a confirmation message to data source 104 including a message indicating failure. In this instance, data source 104 may attempt to transmit the data associated with the plurality of DNS queries at a later time, and anomaly detection system 102 may receive the data associated with the plurality of DNS queries at the later time. In some non-limiting embodiments, the later time may include a time after the most recent attempt by data source 104 to transmit the data associated with the plurality of DNS queries. In some non-limiting embodiments or aspects, anomaly detection system 102 may receive data associated with the plurality of DNS queries from data source 104 at set intervals (e.g., recurring periods) of time (e.g., every minute, every hour, every two hours, etc.).

As shown in FIG. 3, at step 308, process 300 may include polling a data queue. For example, anomaly detection sys-tem 102 may poll the first queue and the second queue with a microservice application to receive the DNS query data and the network domain data with the microservice appli-cation for processing. In some non-limiting embodiments, anomaly detection system 102 may subscribe, with the microservice application, to the first queue, the second queue, and/or a third queue by transmitting a subscription message from the microservice application to the queries exchange, the clients exchange, and/or the domains exchange. In some non-limiting embodiments, anomaly detection system 102 may repeatedly transmit a poll mes-sage to the first queue, the second queue, and/or the third queue. In some non-limiting embodiments, the poll message may check for new query data, new client data, and new domain data available in each queue.

In some non-limiting embodiments, the first queue, the second queue, and/or the third queue may respond to the poll message by transmitting a response to the microservice application. In some non-limiting embodiments, the poll message may include new data. For example, the queries queue (e.g., queries queue 422) may respond to the poll message by transmitting a response to the microservice including the new data (e.g., a new data entry) that is next in line (e.g., at the front of the queue) in the queries queue. Once the queries queue transmits the response to the micro-service, the queries queue may delete the new data entry from the queries queue. In this way, the first queue, the second queue, and/or the third queue may include atomic queues (e.g., only one instance of each data entry exists in a queue and once that data entry is sent to a microservice polling the queue, the data entry is removed, for example deleted, from the queue) which allow for anomaly detection system 102 to handle all incoming data associated with the plurality of DNS queries continuously without crashing or reaching a capacity of stored data.

As shown in FIG. 3, at step 310, process 300 may include detecting a characteristic of a DNS query. For example, anomaly detection system 102 may detect a characteristic of one or more DNS queries of the plurality of DNS queries based on the DNS query data and the network domain data. In some non-limiting embodiments, anomaly detection sys-tem 102 may store the DNS query data and the network domain data in a time-series database. In some non-limiting embodiments, anomaly detection system 102 may determine a geolocation of a server associated with a domain and a category of the domain based on the DNS query data and the network domain data. In some non-limiting embodiments, anomaly detection system 102 may store the DNS query data, the network domain data, the geolocation of the server, and the category of the domain in a database. In some non-limiting embodiments, anomaly detection system 102 may determine the characteristic based on the DNS query data, the network domain data, the geolocation of the server, and the category of the domain.

In some non-limiting embodiments, anomaly detection may detect an anomaly in the data associated with the plurality of DNS queries based on the DNS query data, the network domain data, the client device data, the geolocation of the server, and the category of the domain. In some non-limiting embodiments, anomaly detection system 102 may detect an anomaly in the data associated with the plurality of DNS queries historically (e.g., based on the DNS query data, the network domain data, the client device data, the geolocation of the server, and the category of the domain stored in the database and/or data center 438). In some non-limiting embodiments, anomaly detection system 102 may detect an anomaly in the data associated with the plurality of DNS queries in real-time (e.g., with respect to when the data is received and analyzed by anomaly detection system 102).

Referring now to FIGS. 4A-4H, FIGS. 4A-4H are diagrams of non-limiting embodiments of an implementation 400 of a process (e.g., process 300) for detecting an anomaly in network activity using DNS query data. As shown in FIGS. 4A-4H, implementation 400 may include anomaly detection system 102 performing the steps of the process.

Figure 4A:
Figure 4A:
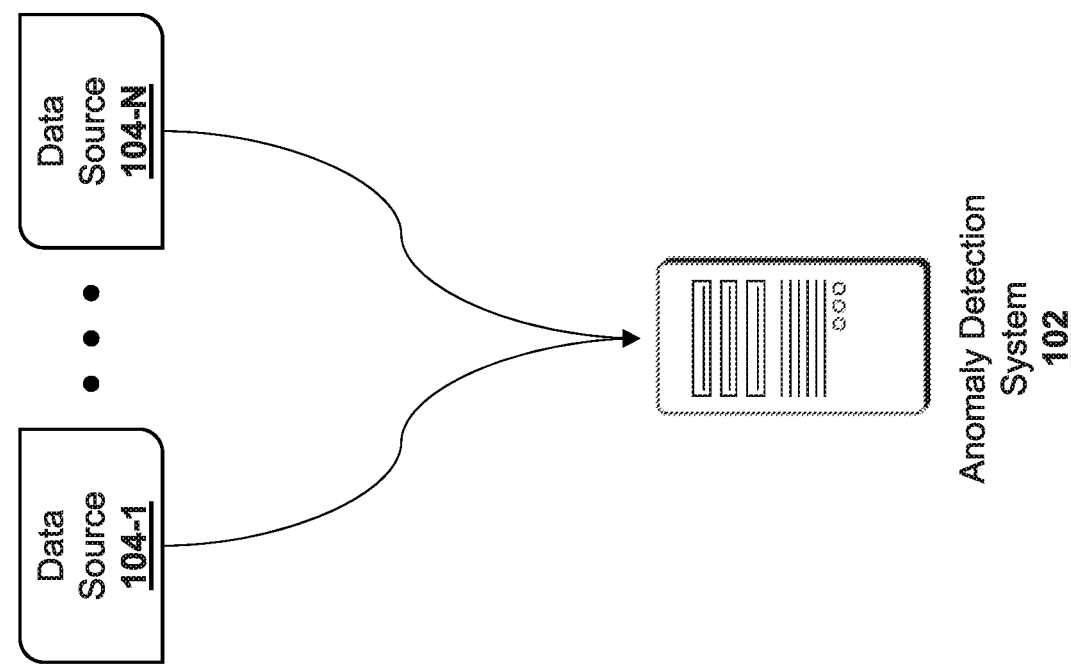

As shown by reference number 401 in FIG. 4A, anomaly detection system 102 may receive data associated with DNS queries. For example, anomaly detection system 102 may receive data associated with a plurality of DNS queries from a plurality of data sources 104. In some non-limiting embodiments, the plurality of DNS queries may be associated with a network connecting client device 106, data source 104, and/or anomaly detection system 102.

Referring now to FIG. 4B, implementation 400 may include data associated with DNS queries, data collection microservice 414, DNS query data, client device data, and network domain data. In some non-limiting embodiments, data collection microservice 414 may be a component (e.g., software component) of anomaly detection system 102. Data collection microservice 414 may perform one or more functions described as being performed by another set of systems or another set of devices (e.g., anomaly detection system 102).

As shown by reference number 403 in FIG. 4B, anomaly detection system 102 may parse data associated with DNS queries. For example, anomaly detection system 102 may parse the data associated with the plurality of DNS queries to provide DNS query data and network domain data. In some non-limiting embodiments, data collection microservice 414 may receive data associated with DNS queries (e.g., data associated with a plurality of DNS queries). In some non-limiting embodiments, data collection microservice 414 may parse data associated with DNS queries to provide DNS query data and network domain data. In some non-limiting embodiments, anomaly detection system 102 may parse the data associated with the plurality of DNS queries to provide client device data. For example, data collection microservice 414 may parse data associated with DNS queries to provide client device data.

In some non-limiting embodiments, DNS query data may include data associated with DNS queries, such as a query domain name (e.g., a domain name), a query type (e.g., A type, NS type, etc.), a query class (e.g., ALL, ANY, CSNET, etc.), and/or the like. In some non-limiting embodiments, client device data may include data associated with client devices (e.g., client device 106), such as a media access control (MAC) address, an IP address, a port (e.g., a port number), and/or the like. In some non-limiting embodiments, network domain data may include data associated with a network domain, such as a domain name, a destination IP address, a destination port (e.g., a destination port number), and/or the like.

Figure 4C:
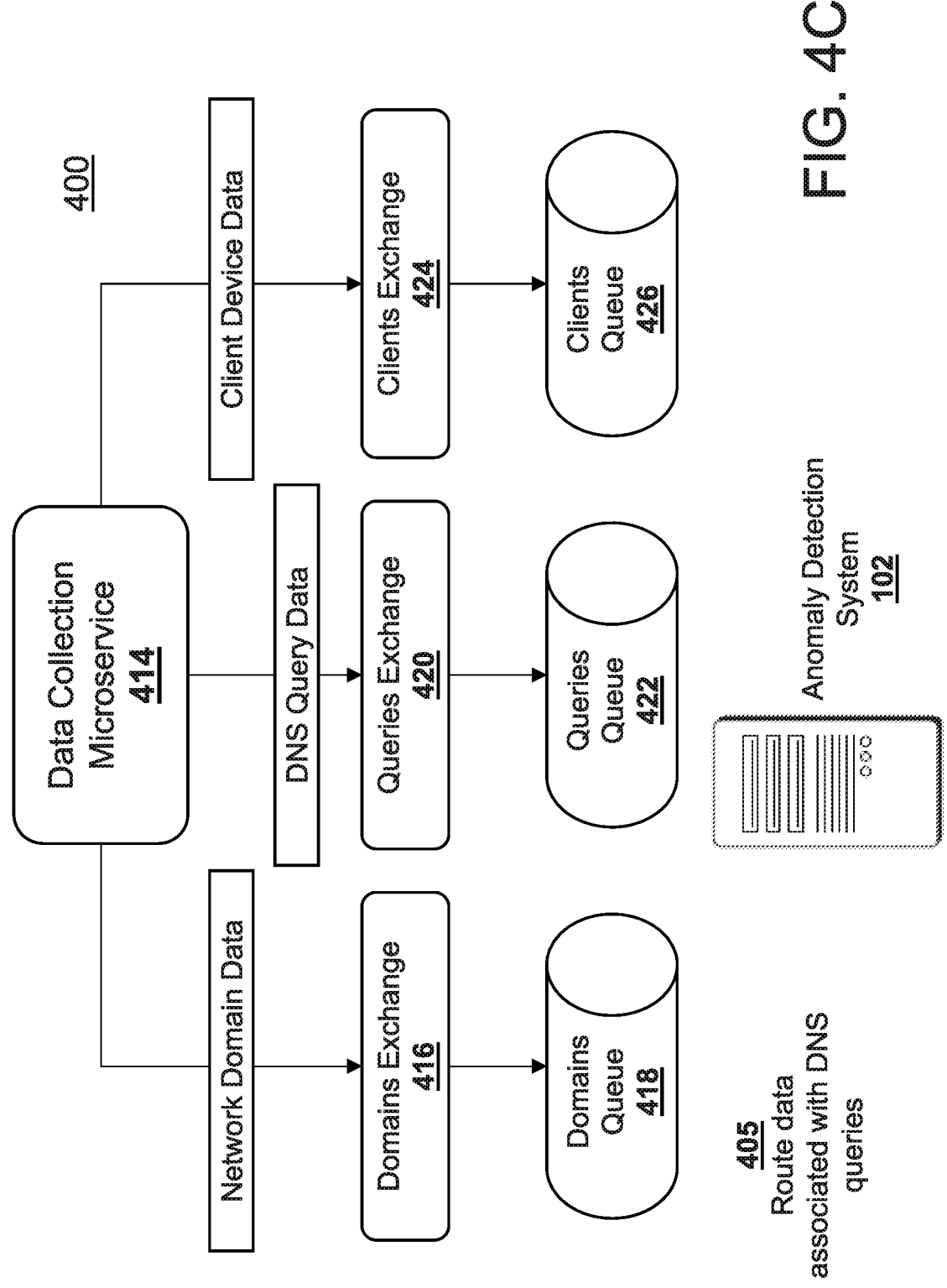

Referring now to FIG. 4C, implementation 400 may include domains exchange 416, domains queue 418, queries exchange 420, queries queue 422, clients exchange 424, and clients queue 426. In some non-limiting embodiments, an exchange may include a software component designed to route incoming messages and/or data to one or more queues based on a routing strategy and/or the subject of the incoming messages and/or data. In some non-limiting embodiments, a queue may include a software component designed to facilitate asynchronous communication between a producer (e.g., data collection microservice 414) and a consumer (e.g., aggregation microservice 428, research microservice 430, and/or trend analysis microservice 432). In some non-limiting embodiments, a queue (e.g., domains queue 418, queries queue 422, and/or clients queue 426) may temporarily store messages in a buffer in a first-in-first-out (FIFO) manner (e.g., in a FIFO buffer). For example, a queue may receive messages from the producer (e.g., data collection microservice 414), and the queue may store the messages in a sequential order corresponding to when the messages were received (e.g., the first message received is stored at the beginning of the queue while the latest message received is stored at the end of the queue). A consumer (e.g., aggregation microservice 428, research microservice 430, and/or trend analysis microservice 432) may retrieve the messages from the queue. Using a queue with a FIFO buffer, the consumer will retrieve the messages in sequential order corresponding to when the messages were received by the queue (e.g., the first message received by the queue will be the first message retrieved by the consumer and the last message received by the queue will be the last message received by the consumer, etc.). Each message in a queue may be processed only once. For example, once a message is retrieved by a consumer, the message is deleted from the queue and the next sequential message in the queue will be the message retrieved by the consumer.

In some non-limiting embodiments, a message may include a request message, a reply message, an error message, and/or a message including a payload (e.g., a message carrying data). For example, a message may include network domain data, DNS query data, and/or client device data. As described herein, a message may include a mechanism of transmitting data from one component (e.g., software component) to another component. For example, transmitting data from a queue to a microservice application may refer to the queue transmitting a message (e.g., a message carrying data) to the microservice application.

In some non-limiting embodiments, domains exchange 416, queries exchange 420, and/or clients exchange 424 may receive incoming messages from data collection microservice 414. In some non-limiting embodiments, domains exchange 416 may receive network domain data from data collection microservice 414. In some non-limiting embodiments, queries exchange 420 may receive DNS query data from data collection microservice 414. In some non-limiting embodiments, clients exchange 424 may receive client device data from data collection microservice 414.

In some non-limiting embodiments or aspects, data collection microservice 414 may act as a gateway (e.g., a component that allows data to be transmitted from one network to another) of anomaly detection system 102. For example, data collection microservice 414 may transmit the data associated with the plurality of DNS queries to the domains exchange, the queries exchange, and/or the clients exchange in response to TMS 108 authorizing data source 104 with respect to anomaly detection system 102. Data collection microservice 414 may delete the data associated with the plurality of DNS queries in response to TMS 108 determining that data source 104 is unauthorized with respect to anomaly detection system 102.

As shown by reference number 405 in FIG. 4C, anomaly detection system 102 may route data associated with DNS queries. For example, anomaly detection system 102 may route DNS query data to a first queue using a queries exchange. In some non-limiting embodiments, anomaly detection system 102 may route DNS query data to queries queue 422 using queries exchange 420. In some non-limiting embodiments, anomaly detection system 102 may route network domain data to a second queue using a domains exchange. For example, anomaly detection system 102 may route network domain data to domains queue 418 using domains exchange 416. In some non-limiting embodiments, anomaly detection system 102 may route client device data to a third queue using a clients exchange. For example, anomaly detection system 102 may route client device data to clients queue 426 using clients exchange 424.

In some non-limiting embodiments, domains queue 418 may store network domain data, such that network domain data is persisted in domains queue 418. In some non-limiting embodiments, queries queue 422 may store DNS query data, such that DNS query data is persisted in queries queue 422. In some non-limiting embodiments, clients queue 426 may store client device data, such that client device data is persisted in clients queue 426. In some non-limiting embodiments, domains queue 418, queries queue 422, and/or clients queue 426 may store messages including network domain data, DNS query data, and/or client device data.

Figure 4D:
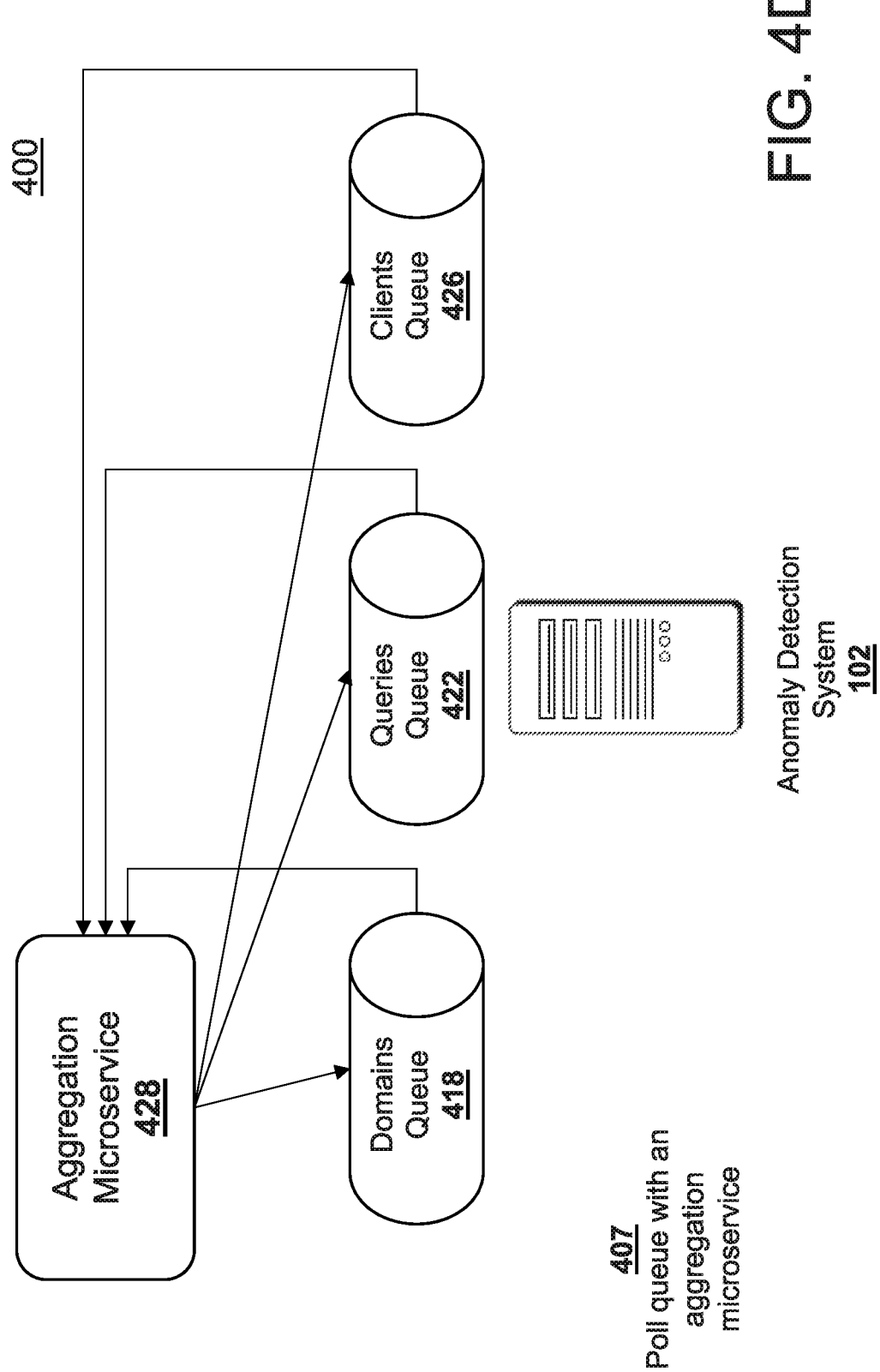

Referring now to FIG. 4D, implementation 400 may include aggregation microservice 428. As shown by reference number 407 in FIG. 4D, anomaly detection system 102 may poll a queue with an aggregation microservice. For example, anomaly detection system 102 may poll the first queue and the second queue with aggregation microservice 428 to receive the DNS query data and the network domain data with aggregation microservice 428 for processing. In some non-limiting embodiments, anomaly detection system 102 may poll a third queue with aggregation microservice 428 to receive the client device data with aggregation microservice 428 for processing. In some non-limiting embodiments, aggregation microservice 428 may poll domains queue 418 to retrieve network domain data. In some non-limiting embodiments, aggregation microservice 428 may poll queries queue 422 to retrieve DNS query data. In some non-limiting embodiments, aggregation microservice 428 may poll clients queue 426 to retrieve client device data.

In some non-limiting embodiments, polling may refer to actively sampling the status (e.g., actively sending poll messages) of a computing device and/or software component by a client application (e.g., a microservice application). In some non-limiting embodiments, polling may include synchronous polling or asynchronous polling with respect to the response to a poll message (e.g., with respect to the retrieval of new data as a result of a poll message). For example, a microservice application (e.g., aggregation microservice 428) may poll a queue by transmitting a first poll message to a queue checking for a new message (e.g., new data) to retrieve from the queue (e.g., domains queue 418). The microservice application may receive a response from the queue indicating that no new data is available while there is no new data available in the queue. In this way, a microservice application may poll a queue synchronously (e.g., short polling).

Additionally or alternatively, a microservice application may poll a queue by transmitting a first poll message checking for new messages to retrieve from the queue. While the queue has no new messages available for the microservice application to retrieve, the microservice application may not receive a response to the first poll message. The first poll message may wait in the queue without transmitting any response to the microservice application. The first poll message may remain with the queue as an unresolved message (e.g., the poll message will wait until a response is transmitted by the queue) until a new message is available in the queue to transmit to the microservice application. The microservice application may terminate the first poll message and poll the queue with a second poll message after an amount of time has passed since the first poll message was sent to the queue. In this way, a microservice application may transmit poll messages to a queue periodically, such that the microservice application will receive a response from the queue including new messages whenever new messages are available in the queue. As soon as a new message (e.g., new data) is available in the queue, the microservice application may receive a response from the queue with the newly available message. In this way, a microservice application may poll a queue asynchronously (e.g., long polling).

In some non-limiting embodiments, aggregation microservice 428 may receive a response message from a queue based on aggregation microservice 428 polling the queue. For example, aggregation microservice 428 may receive a response message from domains queue 418, queries queue 422, and/or clients queue 426 based on aggregation microservice 428 polling domains queue 418, queries queue 422, and/or clients queue 426. In some non-limiting embodiments, a response message may include network domain data, DNS query data, and/or client device data based on the queue that responds to the poll from aggregation microservice 428.

Figure 4E:
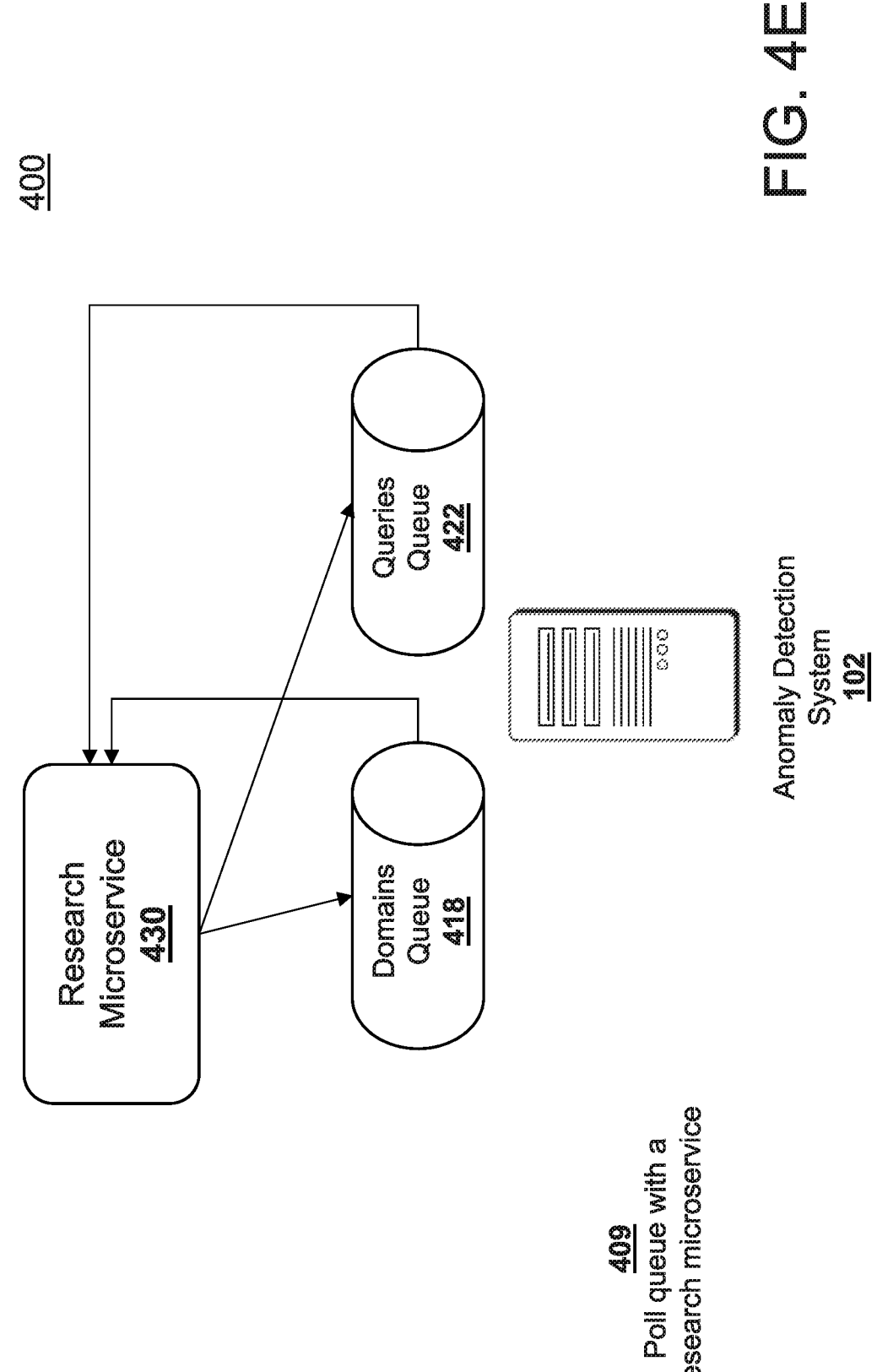

Referring now to FIG. 4E, implementation 400 may include research microservice 430. As shown by reference number 409 in FIG. 4E, anomaly detection system 102 may poll a queue with a research microservice. For example, anomaly detection system 102 may poll the first queue and the second queue with research microservice 430 to receive the DNS query data and the network domain data with research microservice 430 for processing. In some non-limiting embodiments, research microservice 430 may poll domains queue 418 to retrieve network domain data. In some non-limiting embodiments, research microservice 430 may poll queries queue 422 to retrieve DNS query data.

In some non-limiting embodiments, research microservice 430 may receive a response message from a queue based on research microservice 430 polling the queue. For example, research microservice 430 may receive a response message from domains queue 418 and/or queries queue 422, based on research microservice 430 polling domains queue 418 and/or queries queue 422. In some non-limiting embodiments, a response message may include network domain data, DNS query data, and/or client device data based on the queue that responds to the poll from research microservice 430.

Figure 4F:
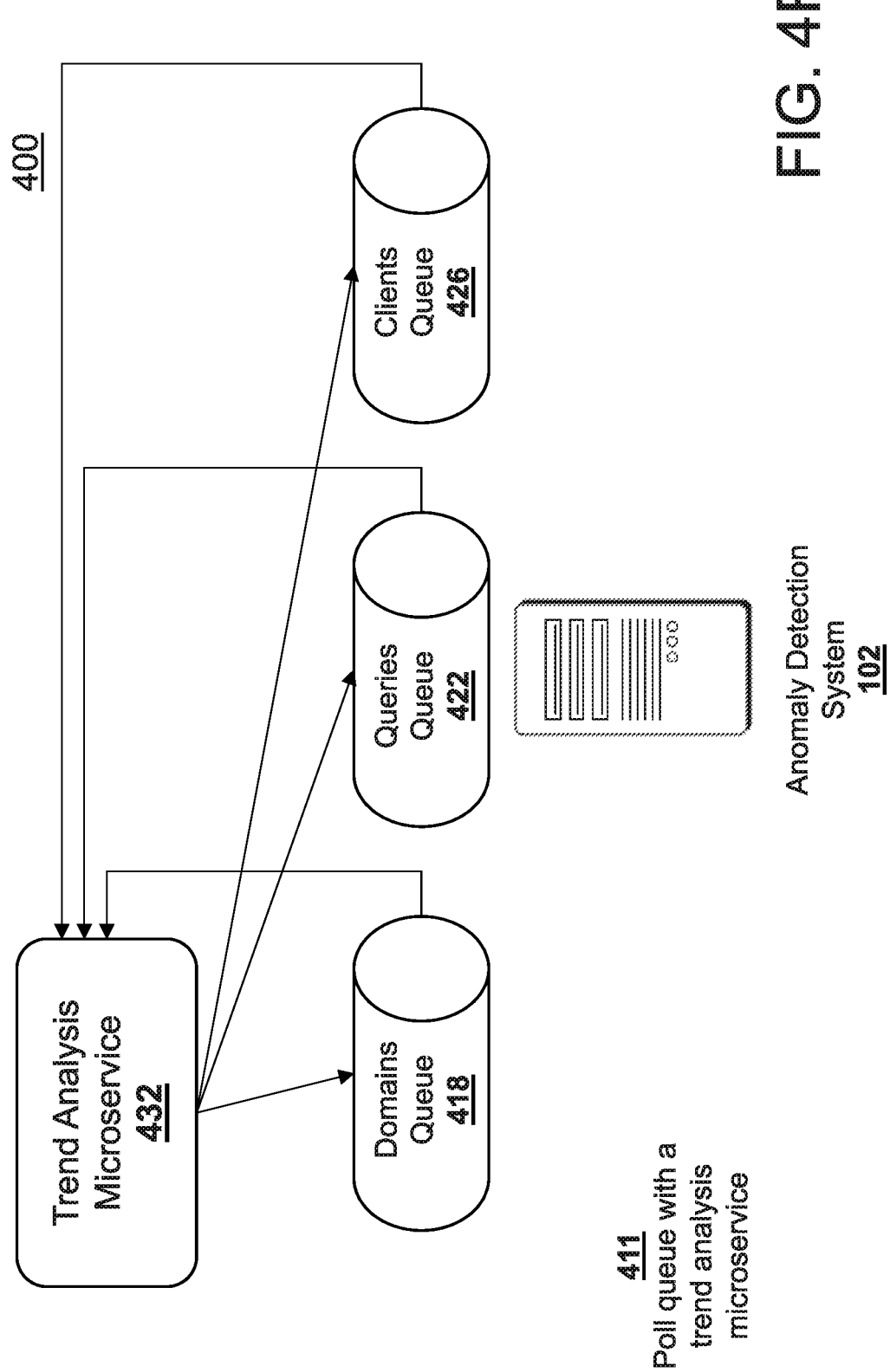

Referring now to FIG. 4F, implementation 400 may include trend analysis microservice 432. As shown by reference number 411 in FIG. 4F, anomaly detection system 102 may poll a queue with a trend analysis microservice. For example, anomaly detection system 102 may poll the first queue and the second queue with trend analysis microservice 432 to receive the DNS query data and the network domain data with trend analysis microservice 432 for processing. In some non-limiting embodiments, anomaly detection system 102 may poll a third queue with trend analysis microservice 432 to receive the client device data with the trend analysis microservice 432 for processing. In some non-limiting embodiments, trend analysis microservice 432 may poll domains queue 418 to retrieve network domain data. In some non-limiting embodiments, trend analysis microservice 432 may poll queries queue 422 to retrieve DNS query data. In some non-limiting embodiments, trend analysis microservice 432 may poll clients queue 426 to retrieve client device data.

In some non-limiting embodiments, trend analysis micro-service 432 may receive a response message from a queue based on trend analysis microservice 432 polling the queue. For example, trend analysis microservice 432 may receive a response message from domains queue 418, queries queue 422, and/or clients queue 426 based on trend analysis microservice 432 polling domains queue 418, queries queue 422, and/or clients queue 426. In some non-limiting embodiments, a response message may include network domain data, DNS query data, and/or client device data based on the queue that responds to the poll from trend analysis micro-service 432.

Figure 4G:
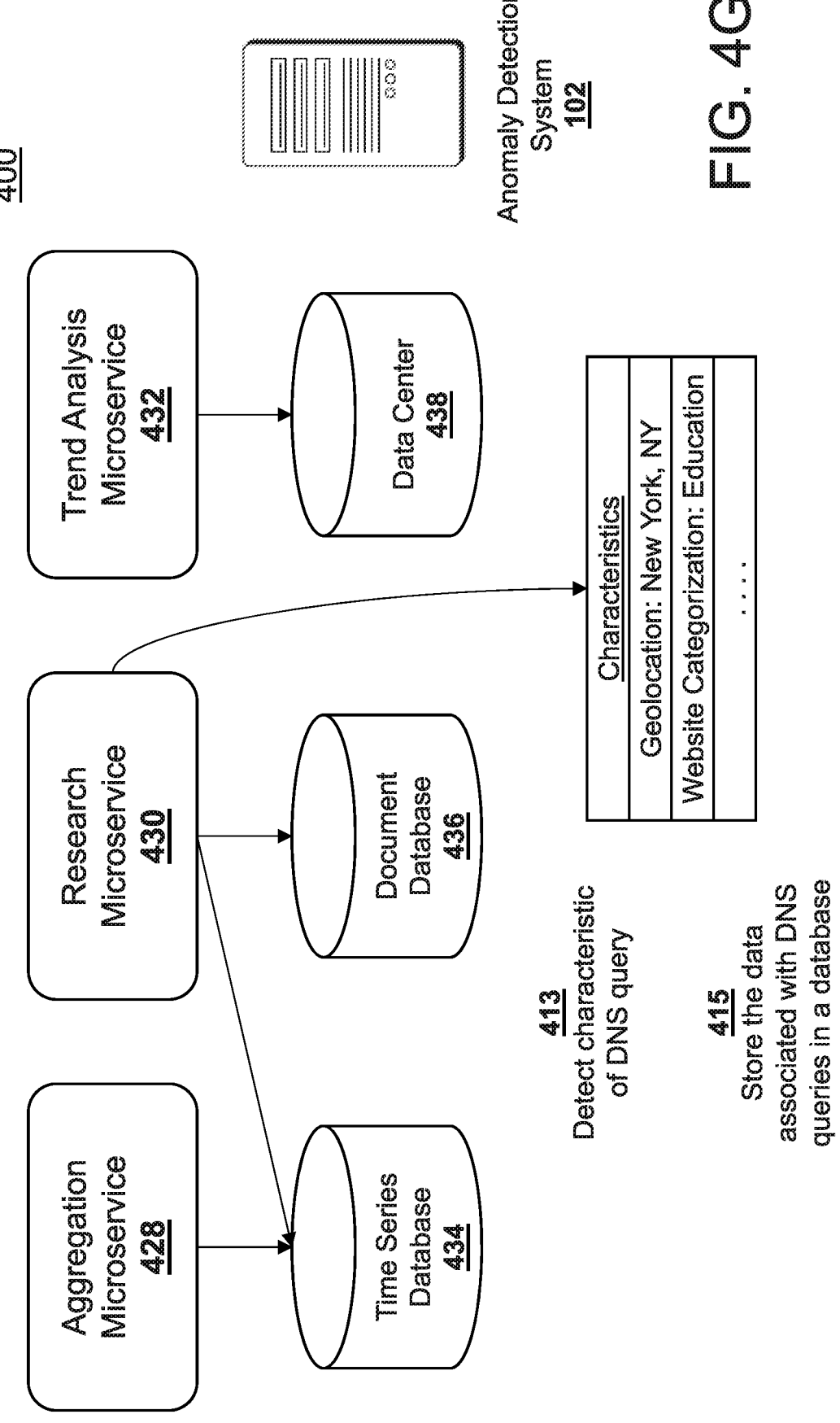

Referring now to FIG. 4G, implementation 400 may include time series database 434, document database 436, and data center 438. In some non-limiting embodiments, time series database 434, document database 436, and/or data center 438 may be the same as or similar to database device 110. In some non-limiting embodiments, time series database 434 may include a database where a primary key for the records stored in the database is a time stamp. For example, time series database 434 may include an InfluxDB® database. In some non-limiting embodiments, document database 436 may include a NoSQL document-oriented database that may store data in JavaScript Object Notation (JSON) format, Binary JSON (BSON) format, and/or Extensible Markup Language (XML) format. For example, document database 436 may include a Mon-goDB® database. In some non-limiting embodiments, data center 438 may include one or more servers and/or com-puting devices centralized in a dedicated space.

As shown by reference number 413 in FIG. 4G, anomaly detection system 102 may detect a characteristic of a DNS query. For example, anomaly detection system 102 may detect a characteristic of one or more DNS queries of the plurality of DNS queries based on the DNS query data and the network domain data. In some non-limiting embodi-ments, research microservice 430 may detect a characteristic of one or more DNS queries including the geolocation of a server targeted in the one or more DNS queries and/or a category of a website corresponding to the domain targeted in the one or more DNS queries. For example, research microservice 430 may detect the geolocation of a server hosting a domain (e.g., nyu.edu) to be "New York, NY" based on a DNS query sent to the server hosting the domain. Given the same DNS query, research microservice 430 may detect the category of the website corresponding to the domain included in the DNS query to be "education." In some non-limiting embodiments, research microservice 430 may detect additional or alternative characteristics of one or more DNS queries.

As shown by reference number 415 in FIG. 4G, anomaly detection system 102 may store the data associated with DNS queries in one or more databases. For example, anomaly detection system 102 may store the data associated with DNS queries in time series database 434, document database 436, and/or data center 438. In some non-limiting embodiments, aggregation microservice 428 may store the data associated with DNS queries in time series database 434. In some non-limiting embodiments, research micros-ervice 430 may store the data associated with DNS queries in time series database 434 and/or document database 436. In some non-limiting embodiments, research microservice 430 may store the characteristic of one or more DNS queries in time series database 434 and/or document database 436. In some non-limiting embodiments, trend analysis micros-ervice 432 may store the data associated with DNS queries in data center 438.

In some non-limiting embodiments, aggregation micros-ervice 428 may aggregate the network domain data, the DNS query data, and/or the client device data into a data report. In some non-limiting embodiments, aggregation microser-vice 428 may aggregate the network domain data, the DNS query data, and/or the client device data to provide aggre-gated data associated with DNS queries. Aggregation micro-service 428 may store the aggregated data associated with DNS queries in time series database 434. In some non-limiting embodiments, time series database 434 may store the aggregated data associated with DNS queries based on a time stamp included as a primary key.

In some non-limiting embodiments, research microser-vice 430 may conduct research based on the network domain data, the DNS query data, and/or the client device data. In some non-limiting embodiments, research microservice 430 may detect the characteristic of one or more DNS queries based on research microservice 430 conducting research using the network domain data, the DNS query data, and/or the client device data.

In some non-limiting embodiments, trend analysis micro-service 432 may collect the data associated with DNS queries to provide trend data. In some non-limiting embodi-ments, trend analysis microservice 432 may anonymize (e.g., remove identifying details) the data associated with DNS queries by removing client device identifiers and/or user identifiers (e.g., MAC addresses, other network iden-tifiers, etc.). In some non-limiting embodiments, trend analysis microservice 432 may generate a total count cor-responding to a number of times a DNS query was made to a particular domain based on the data associated with DNS queries. For example, trend analysis microservice 432 may generate a total count of 7 for "youtube.com" corresponding to the number of DNS queries made to "youtube.com" for a network and/or client devices on a network based on the data associated with DNS queries. In some non-limiting embodi-ments, trend data may include the total count corresponding to a number of times a DNS query was made to a particular domain.

In some non-limiting embodiments, trend analysis micro-service 432 may store trend data in data center 438. In some non-limiting embodiments, trend analysis microservice 432 may generate data reports based on trend data stored in data center 438. In some non-limiting embodiments, trend analy-sis microservice 432 may detect a pattern (e.g., an anomaly) in the data associated with DNS queries based on trend analysis microservice 432 performing analysis (e.g., regres-sion analysis, analysis using a machine-learning model, and/or the like) on the trend data stored in data center 438. In some non-limiting embodiments, anomaly detection sys-tem 102 may perform, or may be capable of performing, the functions of trend analysis microservice 432. Anomaly detection system 102 may include one or more applications (e.g., microservice applications) to perform the same or similar functions as trend analysis microservice 432.

Figure 4H:
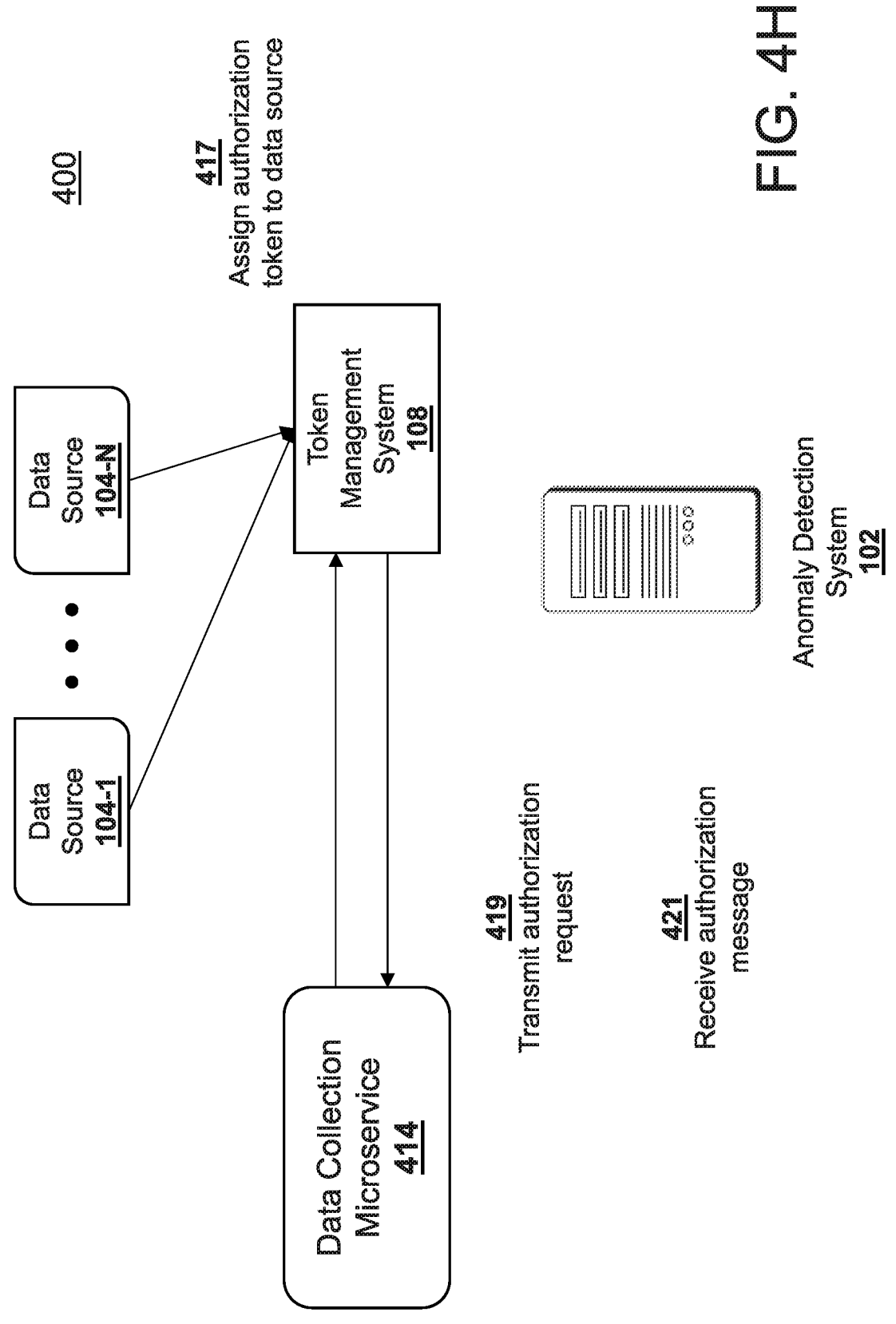

As shown by reference number 417 in FIG. 4H, anomaly detection system 102 may assign an authorization token to a data source. For example, anomaly detection system 102 may assign an authorization token to data source 104. In some non-limiting embodiments, the authorization token may correspond to a token stored in TMS 108. In some non-limiting embodiments, data source 104 may include data associated with a plurality of DNS queries where the data associated with a plurality of DNS queries is assigned the authorization token to provide a tokenized dataset (e.g., the data associated with a plurality of DNS queries where the data is tokenized). In some non-limiting embodiments, data collection microservice 414 may receive the tokenized dataset from data source 104. In some non-limiting embodiments, the tokenized dataset may correspond to one data source 104 (e.g., the data source that sent the tokenized dataset).

As shown by reference number 419 in FIG. 4H, anomaly detection system 102 may transmit an authorization request. For example, anomaly detection system 102 may transmit an authorization request to TMS 108. In some non-limiting embodiments, the authorization request may request TMS 108 to check the network authorization (e.g., the network permissions) of data source 104. In some non-limiting embodiments, the authorization request may be transmitted via an API associated with TMS 108.

In some non-limiting embodiments, anomaly detection system 102 may determine authorization of data sources. For example, anomaly detection system 102 may determine whether each data source 104 of the plurality of data sources 104 is authorized for transmitting the data associated with a plurality of DNS queries to anomaly detection system 102. In some non-limiting embodiments, anomaly detection system 102 may determine whether each data source 104 is authorized to transmit data to anomaly detection system 102. In some non-limiting embodiments, anomaly detection system 102 may determine whether each data source 104 is authorized for transmitting the data associated with a plurality of DNS queries by checking network permissions of data sources 104 based on a token included in the data associated with a plurality of DNS queries (e.g., the tokenized dataset) corresponding to a token stored in TMS 108. For example, anomaly detection system 102 may check network permissions of data source 104 by collecting an authorization token from the data associated with a plurality of DNS queries (e.g., the tokenized dataset transmitted by data source 104) with data collection microservice 414. Data collection microservice 414 may transmit the authorization token to TMS 108 for authorization.

In some non-limiting embodiments, data source 104 corresponding to the tokenized dataset may be authorized or unauthorized to transmit data to anomaly detection system 102 by comparing (e.g., cryptographically verifying) the authorization token (e.g., the tokenized dataset) with the token stored in TMS 108. In some non-limiting embodiments, TMS 108 may check network permissions of data source 104 by comparing (e.g., cryptographically verifying, signing) the authorization token (e.g., the tokenized dataset) with the token stored in TMS 108. In some non-limiting embodiments, an authorized data source 104 may be authorized to transmit data to anomaly detection system 102, and the data associated with the plurality of DNS queries may be processed by data collection microservice 414 and forwarded to one or more of domains exchange 416, queries exchange 420, and/or clients exchange 424. In some non-limiting embodiments, an unauthorized data source 104 may be unauthorized to transmit data to anomaly detection system 102, and the data associated with the plurality of DNS queries that had been previously transmitted to data collection microservice 414 may be deleted by data collection microservice 414. In this way, TMS 108 may authorize data sources 104 by ensuring that the data associated with the plurality of DNS queries received by anomaly detection system 102 is accurate and is delivered from a trusted data source 104. If data source 104 is not trusted (e.g., unauthorized), then anomaly detection system 102 (e.g., data collection microservice 414 of anomaly detection system 102) may delete all data associated with DNS queries received from data source 104 before anomaly detection system 102 further processes the data associated with the plurality of DNS queries (e.g., before routing the data with data collection microservice 414).

As shown by reference number 421 in FIG. 4H, anomaly detection system 102 may receive an authorization message. For example, anomaly detection system 102 may receive an authorization message from TMS 108 including an indication whether data source 104 is authorized or unauthorized. In some non-limiting embodiments, data collection microservice 414 may receive the authorization message from TMS 108. In some non-limiting embodiments, in response to receiving the authorization message from TMS 108, data collection microservice 414 may determine whether data source 104 is authorized to transmit data to anomaly detection system 102. In some non-limiting embodiments, data collection microservice 414 may recognize data source 104 as a trusted data source based on an indication of "authorized" included in the authorization message. For example, data collection microservice 414 may recognize data source 104 as a trusted data source, and data collection microservice 414 may process and/or forward the data associated with the plurality of DNS queries received from data source 104. In some non-limiting embodiments, data collection microservice 414 may recognize data source 104 as an untrusted data source based on an indication of "unauthorized" included in the authorization message. For example, data collection microservice 414 may recognize data source 104 as an untrusted data source, and data collection microservice 414 may delete any data associated with the plurality of DNS queries received from data source 104.

In some non-limiting embodiments, referring to the process shown and described with regard to FIG. 3, one or more of the functions described with respect to the process (e.g., process 300) may be performed with the use of a software application, such as a mobile and/or server application (e.g., a mobile and/or server application that includes anomaly detection system 102). In some non-limiting embodiments, data source 104 and/or client device 106 may include a client-side application to gather (e.g., collect) data associated with a plurality of DNS queries from the network connecting data source 104 and/or client device 106. In some non-limiting embodiments or aspects, anomaly detection system 102 may include a server-side application to receive data associated with a plurality of DNS queries from data source 104 and/or client device 106 (e.g., the data associated with the plurality of DNS queries gathered from the network connecting data source 104 and/or client device 106).

Although the above methods, systems, and computer program products have been described in detail for the purpose of illustration based on what is currently considered to be the most practical and preferred embodiments, it is to be understood that such detail is solely for that purpose and that the present disclosure is not limited to the described embodiments but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A method for detecting anomalies in network data, comprising:
    receiving, with at least one processor, data associated with a plurality of Domain Name System (DNS) queries from a plurality of data sources;

parsing, with the at least one processor, the data associated with the plurality of DNS queries to provide DNS query data and network domain data;

routing, with the at least one processor, the DNS query data to a first queue using a queries exchange;

routing, with the at least one processor, the network domain data to a second queue using a domains exchange;

polling, with the at least one processor, the first queue and the second queue with a microservice application to receive the DNS query data and the network domain data with the microservice application for processing; and detecting, with the at least one processor, a characteristic of one or more DNS queries of the plurality of DNS queries based on the DNS query data and the network domain data, wherein detecting the characteristic of the one or more DNS queries of the plurality of DNS queries comprises:

storing the DNS query data and the network domain data in a time-series database;

determining a geolocation of a server associated with a domain and a category of the domain based on the DNS query data and the network domain data;

storing the DNS query data, the network domain data, the geolocation of the server, and the category of the domain in a database; and determining the characteristic of the one or more DNS queries of the plurality of DNS queries based on the DNS query data, the network domain data, the geolocation of the server, and the category of the domain.

2. The method of claim 1, further comprising:

parsing, with the at least one processor, the data associated with the plurality of DNS queries to provide client device data; and routing, with the at least one processor, the client device data to a third queue using a clients exchange.

3. The method of claim 1, further comprising:

determining whether each data source of the plurality of data sources is authorized for transmitting the data associated with the plurality of DNS queries, wherein determining whether each data source is authorized for transmitting the data associated with the plurality of DNS queries comprises:

checking network permissions of the data source based on an authorization token included in the data associated with the plurality of DNS queries corresponding to a token stored in a token management system.

4. The method of claim 1, wherein parsing the data associated with the plurality of DNS queries comprises:

decoding the data associated with the plurality of DNS queries to provide decoded data associated with the plurality of DNS queries;

parsing the decoded data associated with the plurality of DNS queries into the DNS query data and the network domain data; and publishing the DNS query data to the queries exchange and the network domain data to the domains exchange.

5. The method of claim 1, further comprising transmitting a confirmation message to at least one data source of the plurality of data sources based on routing the DNS query data and the network domain data, wherein the confirmation message comprises a message indicating success or a message indicating failure, wherein the message indicating success causes the at least one data source of the plurality of data sources to delete the data associated with the plurality of DNS queries from memory of the at least one data source, and the message indicating failure causes the at least one data source of the plurality of data sources to retain the data associated with the plurality of DNS queries in the memory of the at least one data source to be received at a next recurring period.

6. The method of claim 1, wherein polling the first queue and the second queue comprises:

subscribing, with the microservice application, to the first queue and the second queue by transmitting a subscription message from the microservice application to the queries exchange and the domains exchange; and repeatedly transmitting a poll message to the first queue and the second queue, wherein the poll message checks for new data associated with the plurality of DNS queries available in the first queue and the second queue.

7. A system for detecting anomalies in network data, comprising at least one processor programmed or configured to:

receive data associated with a plurality of Domain Name System (DNS) queries from a plurality of data sources;

parse the data associated with the plurality of DNS queries to provide DNS query data and network domain data;

route the DNS query data to a first queue using a queries exchange;

route the network domain data to a second queue using a domains exchange;

poll the first queue and the second queue with a microservice application to receive the DNS query data and the network domain data with the microservice application for processing; and detect a characteristic of one or more DNS queries of the plurality of DNS queries based on the DNS query data and the network domain data, and wherein, when detecting the characteristic of the one or more DNS queries of the plurality of DNS queries, the at least one processor is programmed or configured to:

store the DNS query data and the network domain data in a time-series database;

determine a geolocation of a server associated with a domain and a category of the domain based on the DNS query data and the network domain data;

store the DNS query data, the network domain data, the geolocation of the server, and the category of the domain in a database; and determine the characteristic of the one or more DNS queries of the plurality of DNS queries based on the DNS query data, the network domain data, the geolocation of the server, and the category of the domain.

8. The system of claim 7, wherein the at least one processor is further programmed or configured to:

parse the data associated with the plurality of DNS queries to provide client device data; and route the client device data to a third queue using a clients exchange.

9. The system of claim 7, wherein the at least one processor is further programmed or configured to:

determine whether each data source of the plurality of data sources is authorized for transmitting the data associated with the plurality of DNS queries, wherein, when determining whether each data source is authorized for transmitting the data associated with the plurality of DNS queries, the at least one processor is programmed or configured to:

check network permissions of the data source based on an authorization token included in the data associated with the plurality of DNS queries corresponding to a token stored in a token management system.

10. The system of claim 7, wherein, when parsing the data associated with the plurality of DNS queries, the at least one processor is programmed or configured to:

decode the data associated with the plurality of DNS queries to provide decoded data associated with the plurality of DNS queries;

parse the decoded data associated with the plurality of DNS queries into the DNS query data and the network domain data; and publish the DNS query data to the queries exchange and the network domain data to the domains exchange.

11. The system of claim 7, wherein the at least one processor is further programmed or configured to transmit a confirmation message to at least one data source of the plurality of data sources based on routing the DNS query data and the network domain data, wherein the confirmation message comprises a message indicating success or a message indicating failure, wherein the message indicating success causes the at least one data source of the plurality of data sources to delete the data associated with the plurality of DNS queries from memory of the at least one data source, and the message indicating failure causes the at least one data source of the plurality of data sources to retain the data associated with the plurality of DNS queries in the memory of the at least one data source to be received at a next recurring period.

12. The system of claim 7, wherein, when polling the first queue and the second queue, the at least one processor is programmed or configured to:

subscribe, with the microservice application, to the first queue and the second queue by transmitting a subscription message from the microservice application to the queries exchange and the domains exchange; and repeatedly transmit a poll message to the first queue and the second queue, wherein the poll message checks for new data associated with the plurality of DNS queries available in the first queue and the second queue.

13. A computer program product for detecting anomalies in network data, the computer program product comprising at least one non-transitory computer-readable medium including one or more instructions that, when executed by at least one processor, cause the at least one processor to:

receive data associated with a plurality of Domain Name System (DNS) queries from a plurality of data sources;

parse the data associated with the plurality of DNS queries to provide DNS query data and network domain data;

route the DNS query data to a first queue using a queries exchange;

route the network domain data to a second queue using a domains exchange;

poll the first queue and the second queue with a microservice application to receive the DNS query data and the network domain data with the microservice application for processing; and detect a characteristic of one or more DNS queries of the plurality of DNS queries based on the DNS query data and the network domain data, and wherein the one or more instructions that cause the at least one processor to detect the characteristic of the one or more DNS queries of the plurality of DNS queries, cause the at least one processor to:

store the DNS query data and the network domain data in a time-series database;

determine a geolocation of a server associated with a domain and a category of the domain based on the DNS query data and the network domain data;

store the DNS query data, the network domain data, the geolocation of the server, and the category of the domain in a database; and determine the characteristic of the one or more DNS queries of the plurality of DNS queries based on the DNS query data, the network domain data, the geolocation of the server, and the category of the domain.

14. The computer program product of claim 13, wherein the one or more instructions further cause the at least one processor to:

parse the data associated with the plurality of DNS queries to provide client device data; and route the client device data to a third queue using a clients exchange.

15. The computer program product of claim 13, wherein the one or more instructions further cause the at least one processor to:

determine whether each data source of the plurality of data sources is authorized for transmitting the data associated with the plurality of DNS queries, wherein the one or more instructions that cause the at least one processor to determine whether each data source is authorized for transmitting the data associated with the plurality of DNS queries, cause the at least one processor to:

check network permissions of the data source based on an authorization token included in the data associated with the plurality of DNS queries corresponding to a token stored in a token management system.

16. The computer program product of claim 13, wherein the one or more instructions that cause the at least one processor to parse the data associated with the plurality of DNS queries, cause the at least one processor to:

decode the data associated with the plurality of DNS queries to provide decoded data associated with the plurality of DNS queries;

parse the decoded data associated with the plurality of DNS queries into the DNS query data and the network domain data; and publish the DNS query data to the queries exchange and the network domain data to the domains exchange.

17. The computer program product of claim 13, wherein the one or more instructions further cause the at least one processor to transmit a confirmation message to at least one data source of the plurality of data sources based on routing the DNS query data and the network domain data, wherein the confirmation message comprises a message indicating success or a message indicating failure, wherein the message indicating success causes the at least one data source of the plurality of data sources to delete the data associated with the plurality of DNS queries from memory of the at least one data source, and the message indicating failure causes the at least one data source of the plurality of data sources to retain the data associated with the plurality of DNS queries in the memory of the at least one data source to be received at a next recurring period.

* * * * *